Patented Feb. 19, 1946

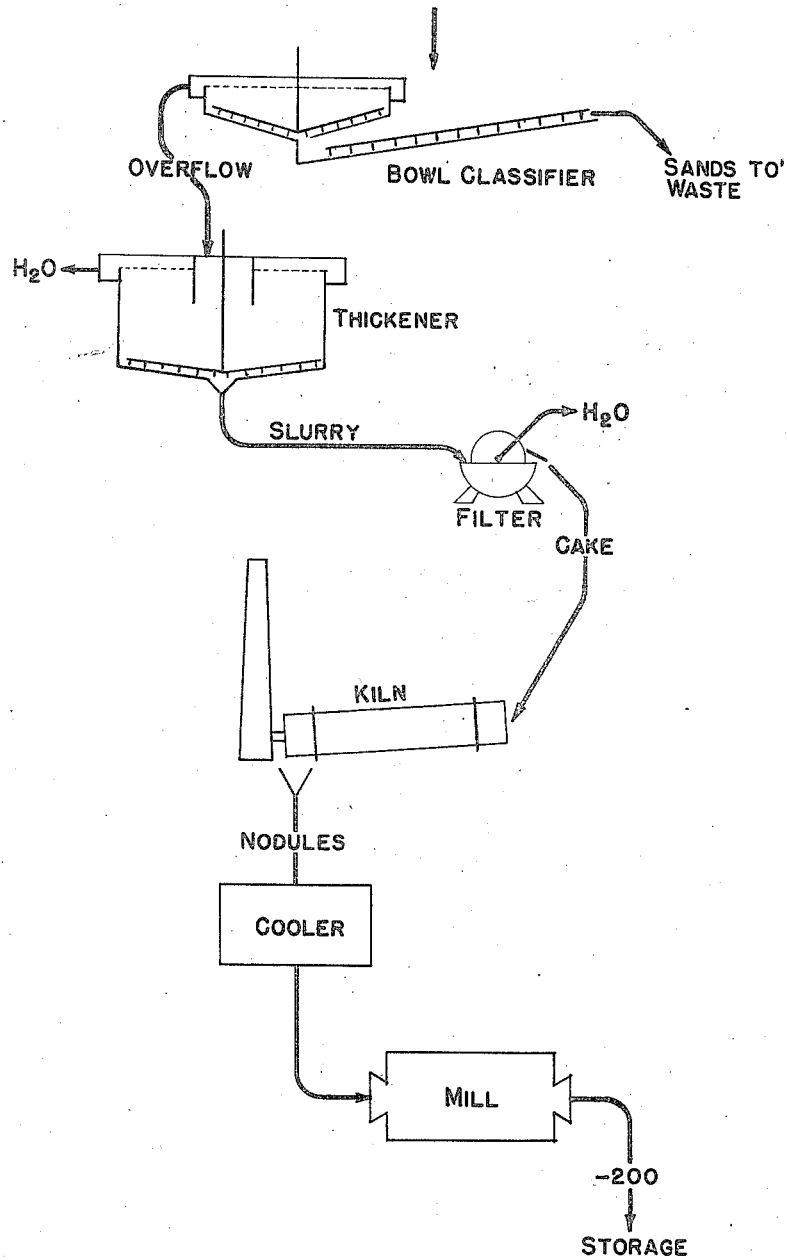

2,395,219

UNITED STATES PATENT OFFICE 2,395,219

FERTILIZER

Stapleton D. Gooch, Lake Wales, Fla., assignor to Pembroke Chemical Corporation, Pembroke, Fla., a corporation of Florida Application August 29, 1944, Serial No. 551,659

3 Claims. (Cl. 71—44)

This invention relates to the rendering available as plant food, of $P_2O_5$ constituents of impure phosphate of alumina clays variously known as Pembroke clay, Bartow clay, road clay phosphatic overburden, and the like, which abound particularly in the phosphate district in Florida, and possibly in other phosphate fields. These clays are found in Florida as overburden lying just over the pebble phosphate deposits. There are millions of tons of this material but no commercial use has been made of it to treat the $P_2O_5$ content thereof. Instead, this type of clay has only been used for road-building, foundation and similar purposes. Therefore, it is an object of this invention to devise a method and means for so treating such natural impure phosphate of alumina that a major portion of its normally unavailable $P_2O_5$ is rendered available for thus producing from such clay, a commercially valuable fertilizer. The word "available" as used herein means soluble in neutral ammonium citrate by the standard method of the U. S. Department of Agriculture, for the determination of available $P_2O_5$ in fertilizers.

Another object of this invention is to discern and use those factors which contribute to the yielding from such material, the greatest proportion of available $P_2O_5$. A further object is to yield such a fertilizer that is substantially non-acid and non-basic, and a still further object is to separate from such material, quantities of those other constituents thereof that are inert solids such as sand, iron, etc.

The invention is based upon my discovery that the normally unavailable $P_2O_5$ of such clays can be rendered available by heat treating such material for a sufficient period of time and at a high enough temperature so that the pH of the material is maintained in a range of not substantially less than 6.5 nor more than 7.5 with the optimum being as near 7.0 as is feasible commercially, and by heating to a temperature in a range of not substantially less than 700° F. nor more than 1100° F., with the optimum being about 900° F. as closely as that temperature can be maintained. Other features of the invention have importance as will appear as this specification proceeds, including particularly fine grinding of the heat treated material, and the combination of apparatus for carrying out the treatment as well as preparatory steps.

The invention has been illustrated diagrammatically in the accompanying drawing which comprises a flow-chart on which is indicated symbolically the various apparatus useable in the various treatment stations or stages of my invention. This shows the best embodiment of my invention at present known to me but obviously changes of specific apparatus, and possibly the sequence thereof can be changed without departing from the spirit of the invention as defined in the appended claims.

The raw clay is taken from its deposit by any usual means and washed by any suitable apparatus such as a scrubber, log washer, or the like. If it has too large lumps, they can be screened out and even ground if desired. The raw material is supplied to a fractionating device such as a bowl classifier wherein the material is in suspension and from which heavier settleable solids are emerged as sands going to waste, while the finer and lighter floatable and especially flocculent solids remaining in suspension are overflowed from the bowl and are passed to a thickener. The thickener is provided with a water overflow and an underflow discharge from whence issues a slurry of thickened flocculent material that is supplied to a dewatering device such as a filter. Water passes from the filter by one path and dewatered cake by another. The cake is then supplied to a kiln wherein heat treatment of the material takes place and such heat treated material issues from the kiln in the form of nodules which are cooled in any suitable cooling device. From the cooler, the material goes to a ball or other grinding mill where it is fine ground, and then the ground material is passed to storage where it comprises the end product of this invention. It is conceivable that a solid bowl centrifuge be substituted for the thickener and the filter.

Clay of the type that abounds in Florida, and especially Pembroke clay, contains naturally from 15% to 30% of flocculent material and about 70% to 85% sand grains or grit. The sand and grit is to be discarded to the extent that there is no major portion thereof in the end product of this invention since it is the fractionated flocculent material that contains the $P_2O_5$ whose treatment is here involved. As the fractionation above described takes place with the material in suspension, the flocculent fraction is thickened to about 30% solids and 70% water. After filtering this slurry, the cake has about 63% solids and about 37% water. If centrifuged, the cake has about 67% solids and about 33% water, but the cake should have a solids content of not substantially less than 55% when fed to the kiln for economical reasons.

The average content of $P_2O_5$ in raw Pembroke clay runs around 5%, whereas in the slurry or cake of flocculent material prepared therefrom, that content runs around five times as much. There seems to be little or no loss of $P_2O_5$ content during the heat treatment whose purpose is to increase the proportion of available $P_2O_5$ as compared with the unavailable portion. In the cake passing to the kiln, the available $P_2O_5$ normally runs from 1% to 3%, whereas when it issues from the kiln and is fine ground, the available $P_2O_5$ runs as high as 85% of the total $P_2O_5$ present. Examples of cake so prepared from Pembroke clay and passing to the kiln showed the following analyses, ignoring small amounts of manganese, chromium and titanium:

|  | I | II | III |
| --- | --- | --- | --- |
|  | Per cent | Per cent | Per cent |
| $Al_2O_3$ | 20.40 | 32.30 | 27.50 |
| $P_2O_5$ | 23.08 | 27.60 | 29.00 |
| CaO | 7.88 | 8.70 | 9.70 |
| $Fe_2O_3$ | 2.88 | 4.18 | 4.90 |
| Fluorine compound | 0.77 | 0.98 | 1.50 |
| Insoluble residue | 23.27 | 13.53 | 11.00 |

All samples showed a considerable amount of combined water. The insoluble residue was insoluble in aqua regia. The ignited residue from acid digestion showed approximately 50% $SiO_2$ volatilized with HF and 50% oxides of the Al- and Fe-group with no CaO or MgO.

Treatment of such material by this invention rendered available from 70% to 85.5% of the $P_2O_5$. The presence of a fluorine bearing constituent seems to have some effect on the highest temperatures to be used in the heat treatment of the clay, because when such fluorine starts to come off (about when the temperature reaches 1100° F.), the amount of available $P_2O_5$ commences to drop. This may be a coincidence, but, at any rate, that temperature seems to be a critical upper limit. The temperature to which the material is heated seems to have an effect of pH. At around 700° F. pH is less than 7.0, while as the temperature rises pH goes to more than 7.0. Above 1100° F. the pH rises above 7.5, so that is another reason why 1100° F. is a critical upper limit. Below 700° F. the pH rises to 7.5 or above, while at 700° F. it drops appreciably. At 600° F. the available $P_2O_5$ drops below 38%, whereas at 700° F. the available $P_2O_5$ rises above 77%, so 700° F. is thus a critical lower limit.

The duration of the heat treatment is also important as it should not be substantially less than one hour, although a longer time seems to have no adverse effect. Fine grinding of the nodulized material after it comes from the heat treatment and is cooled, likewise has an effect on the percentage of the $P_2O_5$ made available; for instance, taking material from the same batch, fine grinding to minus 100 screen mesh (Bureau of Standards) gave 73 plus per cent, while grinding to minus 200 mesh gave better than 85% available $P_2O_5$.

This invention, therefore, teaches how to make from what was formerly considered a worthless material, a new product that, being a neutral plant food high in available $P_2O_5$, should occupy a most important place in agriculture.

I claim:

1. The process of treating phosphate of alumina clay, which comprises treating such clay as it comes from its source to physically remove inert impurities therefrom, heat treating such physically purified material for a sufficient period of time at a temperature lying in a range of from 700° F. to 1100° F. as a result of which the pH of the treated material lies in a range of from 6.5 to 7.5, cooling the heat treated material, and fine grinding the cooled material, whereby the available $P_2O_5$ is significantly increased over that of the raw material.

2. A new article of commerce comprising impure phosphate of alumina clay heat treated to a temperature lying in a range of from 700° F. to 1100° F., wherein the pH thereof lies in a range of from 6.5 to 7.5 and the available $P_2O_5$ content thereof has been increased a significant amount.

3. The article according to claim 2, wherein the $P_2O_5$ content has been raised to more than double what it was in the raw state.

STAPLETON D. GOOCH.